United States Patent
Smith et al.

(10) Patent No.: US 10,428,946 B2
(45) Date of Patent: Oct. 1, 2019

(54) CONFIGURABLE PRESSURE VESSEL

(75) Inventors: Zachary S. Smith, Tuscon, AZ (US);
Darren E. Conner, Tuscon, AZ (US);
Kenji A. Kingsford, Tuscon, AZ (US)

(73) Assignee: Parker-Hannfin Corporation,
Cleveland, OH (US)

( * ) Notice: Subject to any disclaimer, the term of this patent is extended or adjusted under 35 U.S.C. 154(b) by 734 days.

(21) Appl. No.: 13/128,240

(22) PCT Filed: Oct. 28, 2009

(86) PCT No.: PCT/US2009/062292
§ 371 (c)(1),
(2), (4) Date: May 9, 2011

(87) PCT Pub. No.: WO2010/080194
PCT Pub. Date: Jul. 15, 2010

(65) Prior Publication Data
US 2011/0233217 A1    Sep. 29, 2011

Related U.S. Application Data

(60) Provisional application No. 61/121,679, filed on Dec. 11, 2008.

(51) Int. Cl.
*F16J 12/00* (2006.01)
*B01J 3/03* (2006.01)
(52) U.S. Cl.
CPC .............. *F16J 12/00* (2013.01); *B01J 3/03* (2013.01); *B01J 2219/0295* (2013.01)
(58) Field of Classification Search
CPC ..................................................... F16J 12/00

(Continued)

(56) References Cited

U.S. PATENT DOCUMENTS 4,304,530 A    12/1981  Gens
4,778,073 A *  10/1988  Ehs ................. B29C 53/602
                                                    220/590

(Continued)

FOREIGN PATENT DOCUMENTS

DE    20023411 U1    5/2004
FR    2033 178 A     12/1970
GB    2 186 524 A    8/1987

OTHER PUBLICATIONS

Notification of Transmittal of the International Search Report and Written Opinion of the International Searching Authority, or the Declaration dated Apr. 26, 2010 in corresponding International Application No. PCT/US2009/062292.

*Primary Examiner* — Anthony D Stashick
*Assistant Examiner* — Raven Collins
(74) *Attorney, Agent, or Firm* — John A. Molnar, Jr.

(57) ABSTRACT

End cap section (10) for use in the construction of a configurable pressure vessel (80) and the vessel constructed thereof. The vessel having an interior volume and including at least one such end cap section joined to a second section. The end cap section (10) has a tubular wall (12) extending from an enclosed first end (16) to an open second end (18). At least one mounting pad (30) is positioned on the outer surface (20) of the wall on the enclosed first end (16) thereof. Such mounting pad has a base portion (32*a*-*e*) supported on the wall (12) and a generally tubular stub portion (34*a*-*e*) extending outwardly from the base portion intermediate a proximal end adjoining the wall (12) and a distal end (40*a*-*e*) configurable for connection to a fluid component (90). With the stub proximal end being closed by the wall, such end is openable through the wall to provide a port opening into the interior volume of the vessel.

15 Claims, 9 Drawing Sheets

(58) Field of Classification Search
USPC ........ 220/581, 631, 200, 601, 661, 612, 592
See application file for complete search history.

(56) References Cited

U.S. PATENT DOCUMENTS

| | | | |
|---|---|---|---|
| 5,697,515 | A * | 12/1997 | Syler et al. ................. 220/62.11 |
| 6,012,411 | A * | 1/2000 | Hochbrueckner ............ 116/207 |
| 6,085,940 | A | 7/2000 | Ferri, Jr. |
| 6,206,240 | B1 | 3/2001 | Osgar et al. |
| D491,630 | S * | 6/2004 | Hsiao ........................... D23/202 |
| 7,007,822 | B2 | 3/2006 | Forshey et al. |
| 7,025,234 | B2 | 4/2006 | Priebe et al. |

\* cited by examiner

CONFIGURABLE PRESSURE VESSEL

CROSS-REFERENCE TO RELATED CASES

The present application claims the benefit of the filing date of U.S. Provisional Application Ser. No. 61/121,679; filed Dec. 11, 2008, the disclosure of which is expressly incorporated herein by reference.

BACKGROUND OF THE INVENTION

The present invention relates broadly to pressure dispensing and/or mixing systems such as for liquid chemicals used in the semiconductor manufacturing industry, and more particularly to a pressure vessel that may be used in such systems which is configurable to support different combination of valves and fitting connections.

Processes for semiconductor manufacture typically involve the mixing and/or dispensing under pressure of corrosive or caustic liquid chemicals. Systems for these processes conventionally employ tanks or other vessels constructed of chemically-resistant materials such as fluoropolymers. Such systems and tanks are described, for example, in U.S. Pat. Nos. 7,025,234; 7,007,822; 6,206,240; and 6,085,940. Other tanks such as fuel tanks for motor vehicles are described, for example, in U.S. Pat. No. 4,304,530.

It is believed that improvements in fluoropolymer or other pressure vessels would be well-received by semiconductor manufacturers and others in the chemical processing industries.

BROAD STATEMENT OF THE INVENTION

The present invention is directed to a pressure vessel and a comprising end cap section thereof which may be molded or otherwise formed of a fluoropolymer or other chemically-resistant material. More particularly, the invention is directed to such a tank or section which is configurable so as to accommodate different combinations of valves, regulators, fittings, couplings, manifolds, sensors, or other fluid connector or control components which may be connected or otherwise integrated directly onto the surface of the vessel. In such way, the vessel of the present invention may be used to eliminate leak paths and reduce dead volumes.

In accordance with the precepts of the present invention, at least one of the vessel end cap sections is molded or otherwise formed as having one or more universal mounting pads thereon which may include a center such pad surrounded by a radius of one or more other such pads. The pads may be provided as including a generally upstanding tubular stub to which the fluid components are weldable or otherwise connectable, and which is openable through the wall of the section into the interior volume thereof so as to provide a port. Alternatively, the stub may be machined off or otherwise removed so as to allow for the pad to be reformed, such as with a thermoforming tool, for a tongue-and-groove or similar connection of the fluid component.

Advantageously, the mounting pads may be molded or otherwise provided on the wall of the section with the wall intact such that the port is closed. If the mounting pad is to remain unutilized, the port can be left closed so as to eliminate a potential dead volume and leak path. If, however, the pad is to be used for the mounting of a fluid component to the section, the wall my be opened, such as by drilling or otherwise machining or thermoforming through the material of the wall to thereby open the port.

The present invention, accordingly, comprises the design, fabrication, construction, combination of elements, and/or arrangement of parts and steps, which are exemplified in the detailed disclosure to follow. Advantages of the present invention include a pressure vessel or section thereof which is configurable to support a variety of valve and fitting arrangements without an increase in dead volume or leak potential. Additional advantages include a construction which may be molded or otherwise formed of a fluoropolymer other chemically-resistant material, and which may be used in processes for the pressure dispensing and/or mixing of liquid chemicals used in semiconductor manufacturing. These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein.

Figure 1:
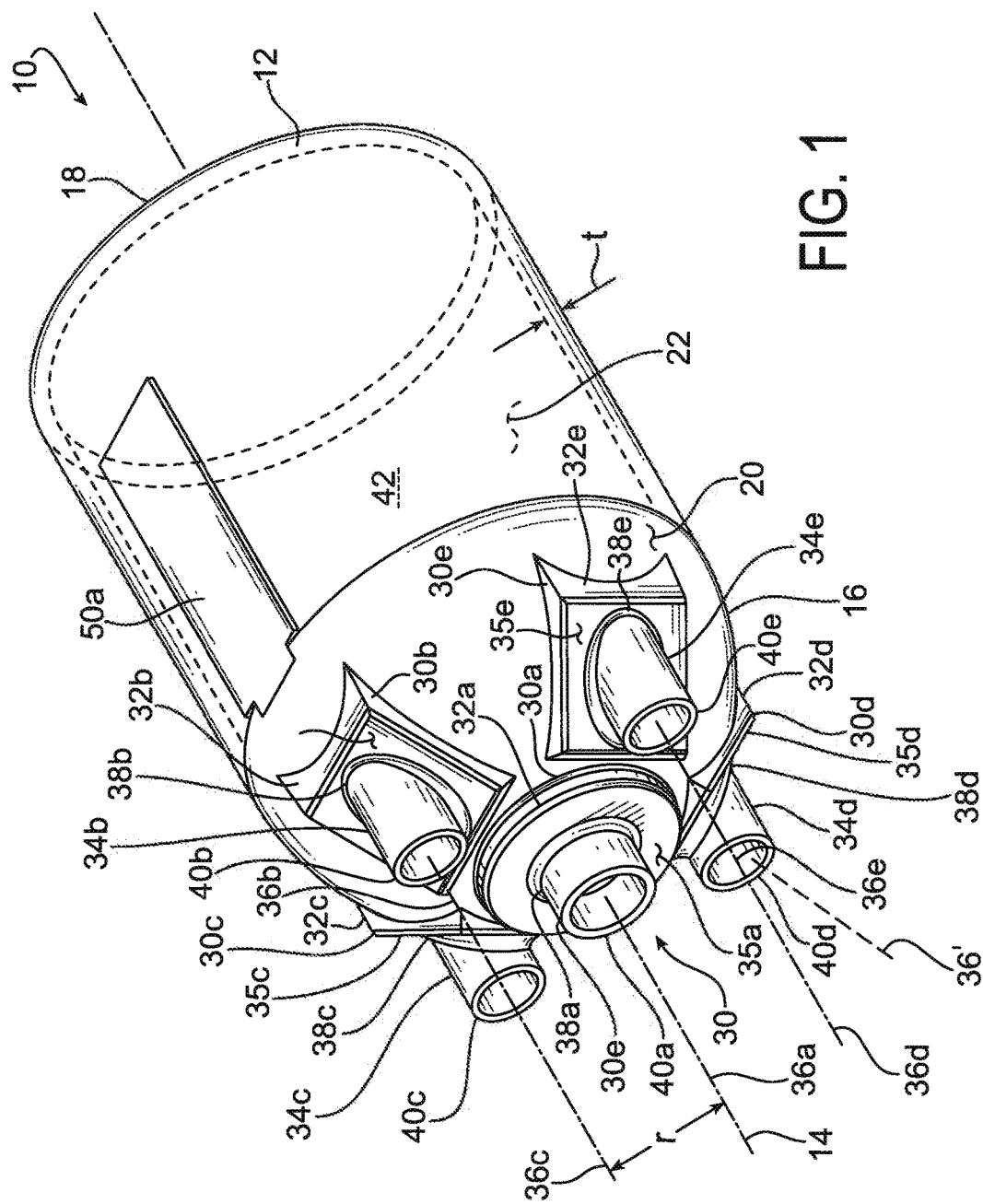
FIG. 1 is an isometric of a pressure vessel end cap section in accordance with the present invention.

The drawings will be described further in connection with the following Detailed Description of the Invention.

DETAILED DESCRIPTION OF THE INVENTION

Certain terminology may be employed in the description to follow for convenience rather than for any limiting purpose. For example, the terms "forward," "rearward," "right," "left," "upper," and "lower" designate directions in the drawings to which reference is made, with the terms "inward," "interior," "inner," or "inboard" and "outward," "exterior," "outer," or "outboard" referring, respectively, to directions toward and away from the center of the referenced element, and the terms "radial" or "horizontal" and "axial" or "vertical" referring, respectively, to directions, axes, planes perpendicular and parallel to the central longitudinal axis of the referenced element. Terminology of similar import other than the words specifically mentioned above likewise is to be considered as being used for purposes of convenience rather than in any limiting sense.

In the figures, elements having an alphanumeric designation may be referenced herein collectively or in the alternative, as will be apparent from context, by the numeric portion of the designation only. Further, the constituent parts of various elements in the figures may be designated with separate reference numerals which shall be understood to refer to that constituent part of the element and not the element as a whole. General references, along with references to spaces, surfaces, dimensions, and extents, may be designated with arrows.

For the illustrative purposes of the discourse to follow, the configurable pressure vessel section of the invention herein involved is described in connection with its construction of a chemically-resistant fluoropolymer material such as a polytetraflurorethylene for use in the pressure dispensing and/or mixing of liquid chemicals for semiconductor manufacturing. It will be appreciated, however, that aspects of the present invention may find utility in other configurations and/or materials for other manufacturing, processing, or transport systems. Such constructions and uses therefore should be considered to be expressly within the scope of the present invention.

Figure 2:
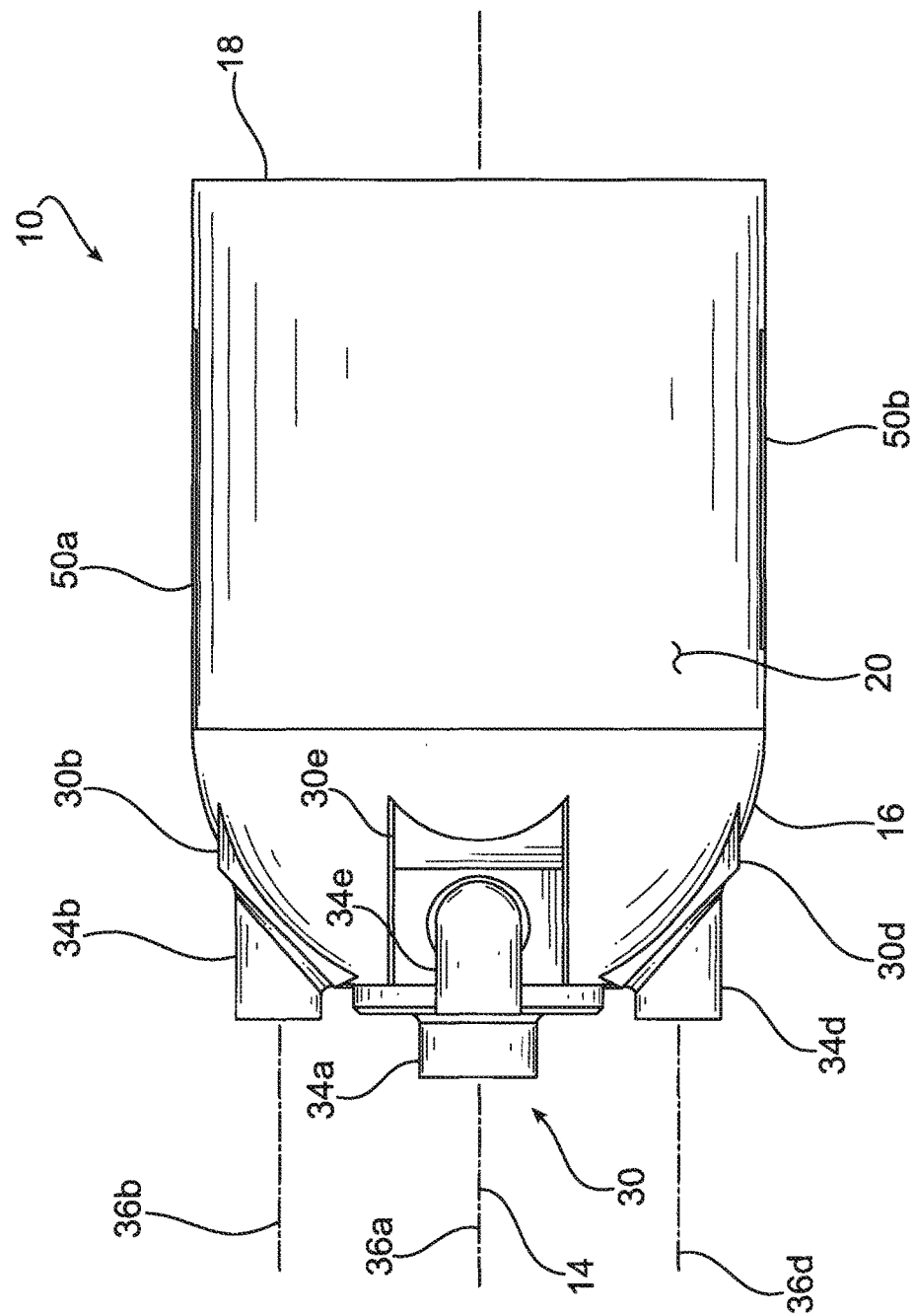
FIG. 2 is a side view of the end cap section of FIG. 1.
Figure 3:
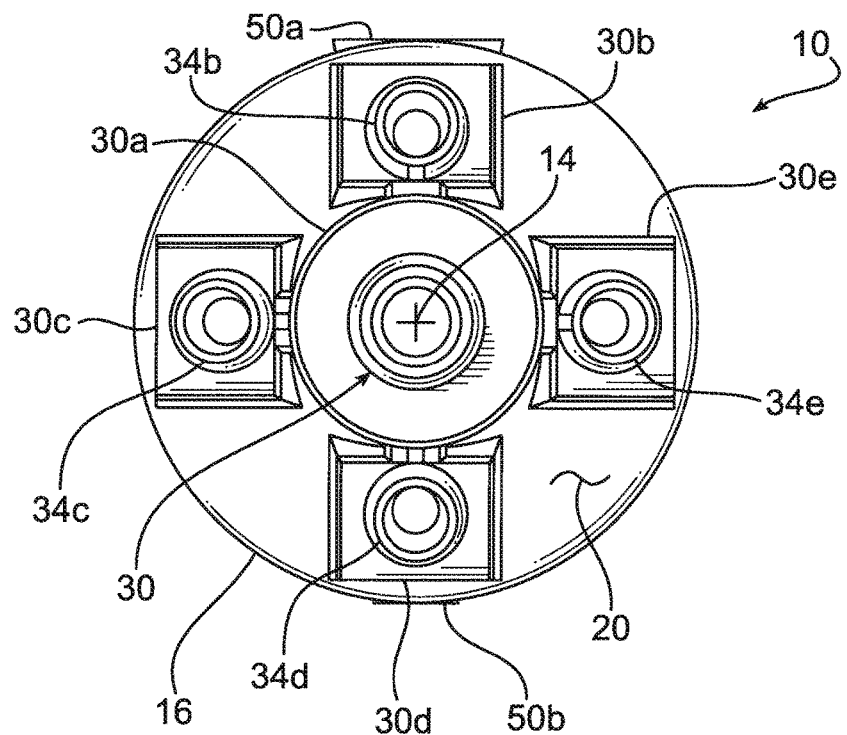
FIG. 3 is a top view of the end cap section of FIG. 1.
Figure 4:
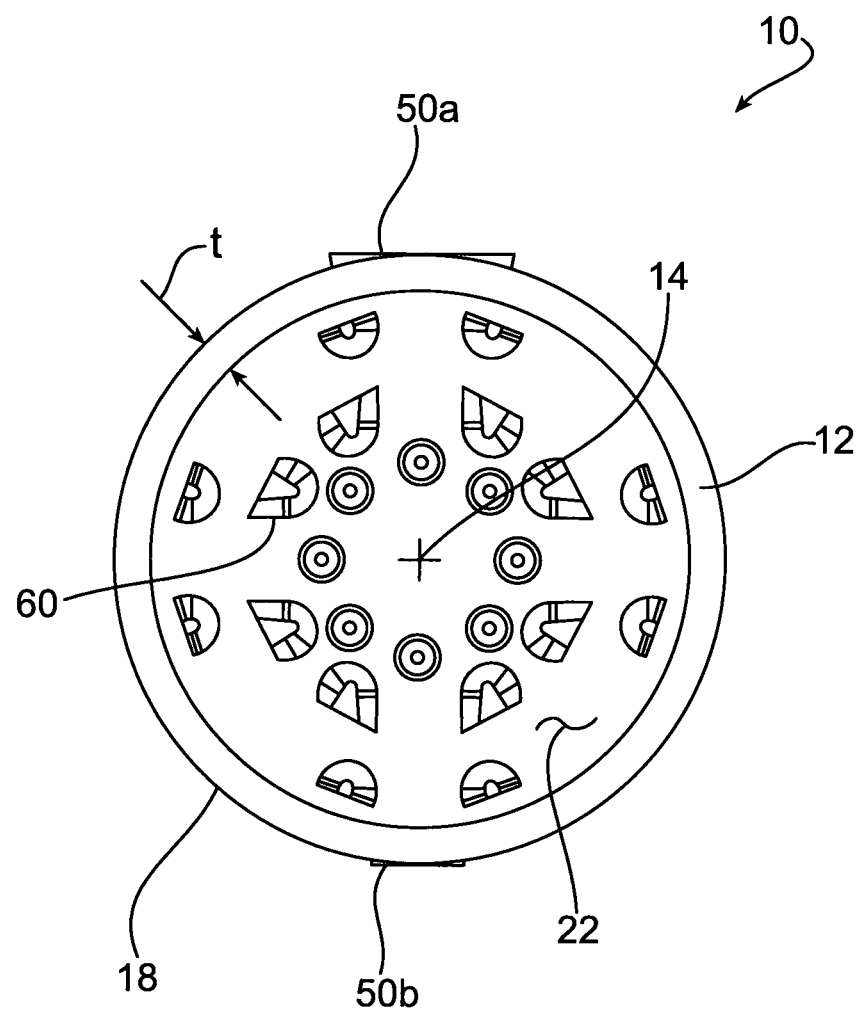
FIG. 4 is a is a bottom view of the end cap section of FIG. 1.

Referring then to the figures wherein corresponding reference characters are used to designate corresponding elements throughout the several views with equivalent elements being referenced with prime or sequential alphanumeric designations, a representative end cap section for a configurable pressure mixing or dispensing vessel in accordance with the present invention is shown generally at 10 in the cross-sectional view of FIG. 1 and the several projection views of FIG. 2-4. In basic construction, section 10 is formed of a generally tubular wall, 12, extending along a central longitudinal wall axis, 14, from an enclosed first end, 16, which may be generally hemispherical as shown, to an open second end, 18. The wall has an outer surface, 20, and an inner surface, referenced in phantom at 22 in FIG. 1, defining a wall thickness dimension, "t," therebetween.

At least one mounting pad, referenced generally at 30, is positioned on the wall outer surface 20 on the enclosed first end 16. In the configuration of section 10 illustrated in the FIGS. 1-4, a center mounting pad, 30*a*, is provided as surrounded by an arrangement of at least one and, preferably two or more, peripheral mounting pads, 30*b-e*, which may be arranged as shown in a generally circular pattern about the center pad 30*a*. Each of the mounting pads 30 has a base portion, 32*a-e*, respectively, supported on the wall 12 and a generally tubular stub portion, 34*a-e*. Each of the base positions 32 may be configured as shown as having a generally planar exterior face, 35*a-e*, respectively, which surrounds the corresponding stub portion 34*a-e*. Each of the stub portions 34*a-e* extends along a corresponding central longitudinal stub axis, 36*a-e*, outwardly from the corresponding base portion 32*a-e* intermediate a proximal end, 38*a-e*, each of which adjoins the wall 12 and is closed thereby, and a distal end, 40*a-e*. As is detailed hereinafter, each of the pads 30*a-e* is configurable for connection to a fluid component, such as a valve, regulator, fitting, coupling, manifold, sensor, or other fluid connector or control component, and, in conjunction with the other pads 30, any combination thereof following the opening in the manner to be described of the proximal end 38 of the corresponding stub portion 34 through the wall 12 to provide a port opening into the interior volume, referenced in phantom in FIG. 1 at 42, of the section 10. In the arrangement of the pads 30 shown in FIGS. 1-4, axis 36*a* is generally coaxial with the axis 14, with the axes 36*b-e* being spaced-apart a given radial distance, referenced at "r" in FIG. 1, therefrom.

Although the axes 36*a-e* are shown in the views of FIGS. 1-4 to be parallel, it should be appreciated that one or more of the axes may be non-parallel, such as is shown in phantom at 36', so as to allow for the off-axis mounting of one or more of the fluid components. Also, although the stub portions 34 each may be configured as shown with the center stub portion 34*a* being of a larger diameter than the peripheral stub ends 34*b-e*, it should be appreciated that the stub portions 34 may be of the same diameter, or one or more of them may be of a larger or smaller diameter, as the requirements of the intended application may dictate.

Figure 3A:
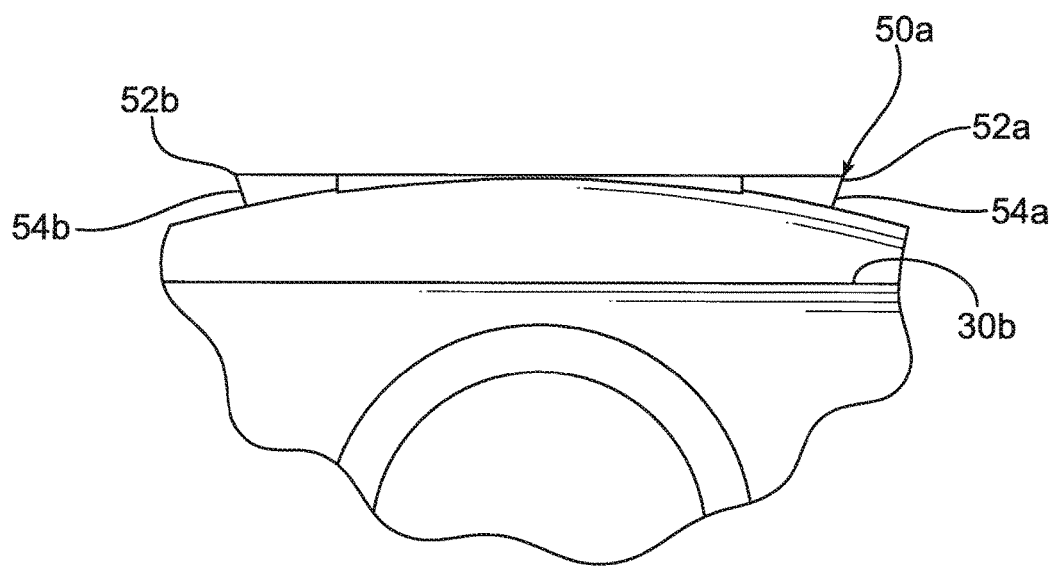
FIG. 3A is a detail of the top view of FIG. 3.

As may be necessary or desirable depending upon the intended application, section 10 may be further configured as having generally planar flats portion, referenced at 50*a* in FIGS. 1 and 3A and at 50*a-b* in the remaining FIGS. 2-4, disposed on one or more sides of the wall outer surface 20 intermediate the ends 16 and 18. Looking additionally momentarily to the detail depicted in FIG. 3A, the flats portion 50 may be formed as having a first side, 52*a*, and an second side, 52*b*, opposite the first side 52*a*. Each of the sides 52*a-b* may having a corresponding dovetail or other shaped groove, 54*a-b*, extending therealong. In this way, a sensor, such as a capacitive level sensor, may be affixed to the tank via a miniature dovetail clamp or the like. Additionally, as may be seen in the bottom view of FIG. 4, the inner surface 22 of the wall 12 may be formed as having an arrangement of bosses, one of which is reference at 60, located beneath a corresponding one of the pads 30 so as to allow for a tongue-in-groove or other screw or bolt flange mounting of a fluid component to the pad.

The end cap section 10 may be molded or otherwise formed of a polymeric material or a reinforced or other composite, and typically a thermoplastic or other plastic material or composite. For chemical compatible with the liquid chemistries used in semiconductor manufacturing processes, such material or composite may be a fluoropolymer, such a polytetraflurorethylene, or a fluoropolymer copolymer or blend.

Figure 5:
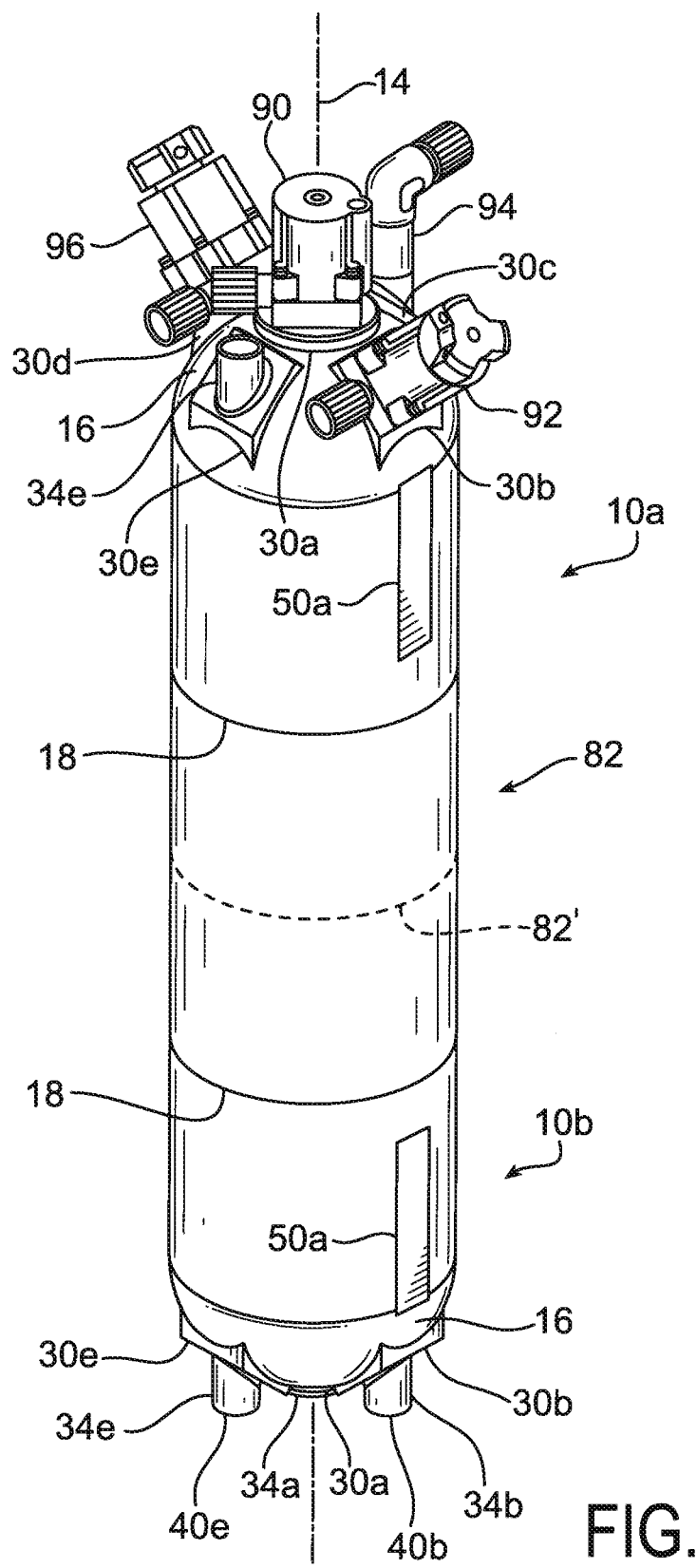
FIG. 5 is an isometric view of a representative pressure vessel construction in accordance with the present invention.
Figure 6:
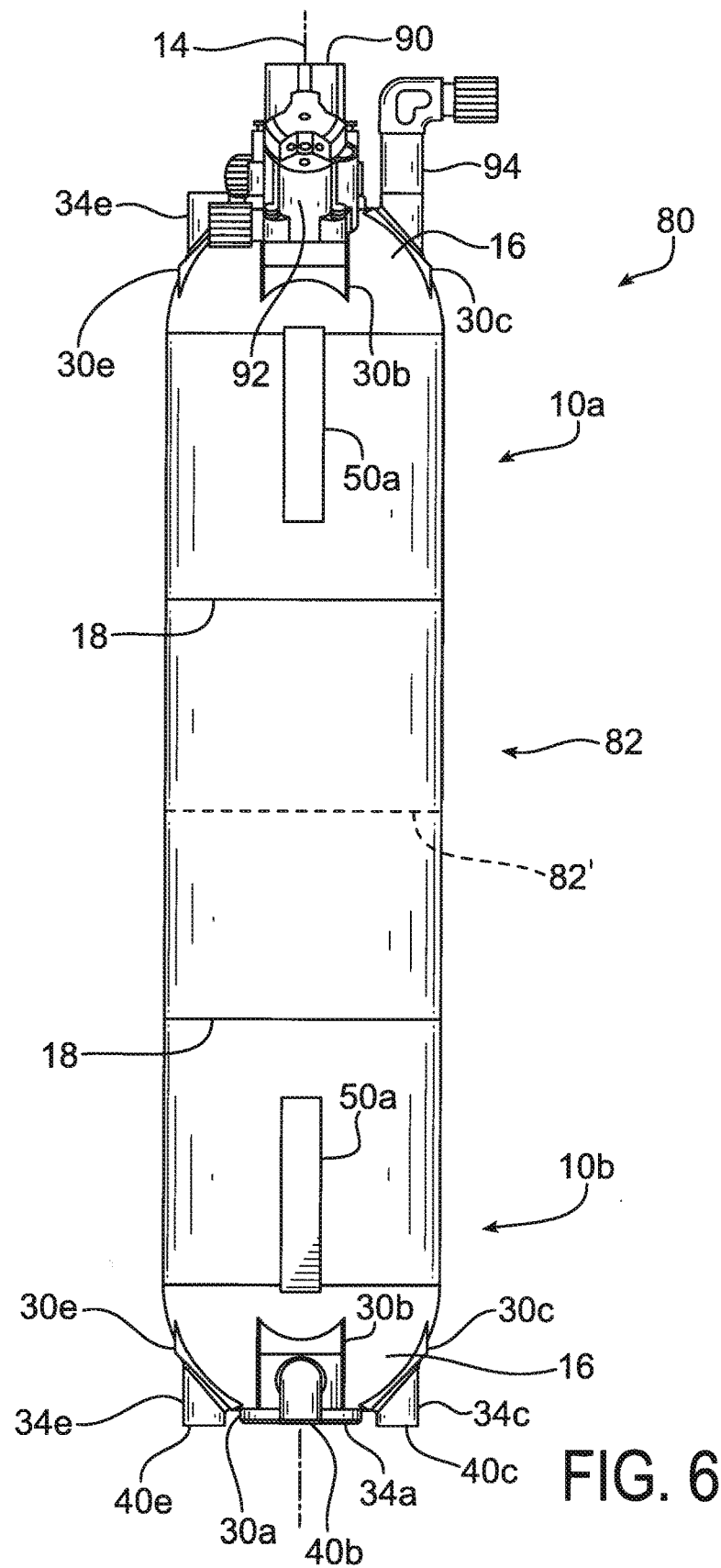
FIG. 6 is a side view of the vessel of FIG. 5.

Turning next to the isometric views of FIGS. 5 and 6, a pair of the end cap sections 10, referenced at 10*a* and 10*b*, are shown as comprising each end of a pressure vessel, referenced generally at 80. As may be seen, each end cap section is joined, such as by being fusion or adhesively bonded or, alternatively, mechanically fastened or otherwise attached to one or more tubular mid-sections, one of which is referenced at 82, which my be of any axial length. It should be appreciated, however, that depending upon, for example, the volumetric requirements for the vessel, multiple mid-sections 82 may be provided, such as represented in phantom at 82', or the sections 10*a-b* may be joined directly to each other. Likewise, each or both of the sections 10*a-b* may be integrally-formed into the vessel 80 if, for example, the vessel is blow, rotationally, or otherwise molded or formed as a unitary article.

In the exemplary embodiment shown in FIGS. 5 and 6, the porting of pads 30*a-d* of section 10*a* will be understood to be in an open state for the attachment of a corresponding valve, fitting, regulator, or other fluid component, 90, 92, 94, and 96, thereto. The porting of pad 34*e*, however, which is not utilized in the example will be understood to remain closed. Likewise, the porting of the corresponding pads 30*a-d* of the section 10*b* is closed so as to close off that end of the vessel 80. As illustrated for the section 10*b*, the peripheral stub portions 34*b-e* thereof may be molded or machined to be coterminous with the axial extent of the end 16 thereof, such as defined by the extent of the center stub portion 34*a* which may be molded or machined to be foreshortened from the length shown in the preceding FIGS. 1-4. In this way, the distal ends 40*b-e* of the pads 30 *b-e* of section 10*b* may be used for a base so as to allow the vessel 80 to be generally self-supporting in the upstanding orientation shown.

Figure 7:
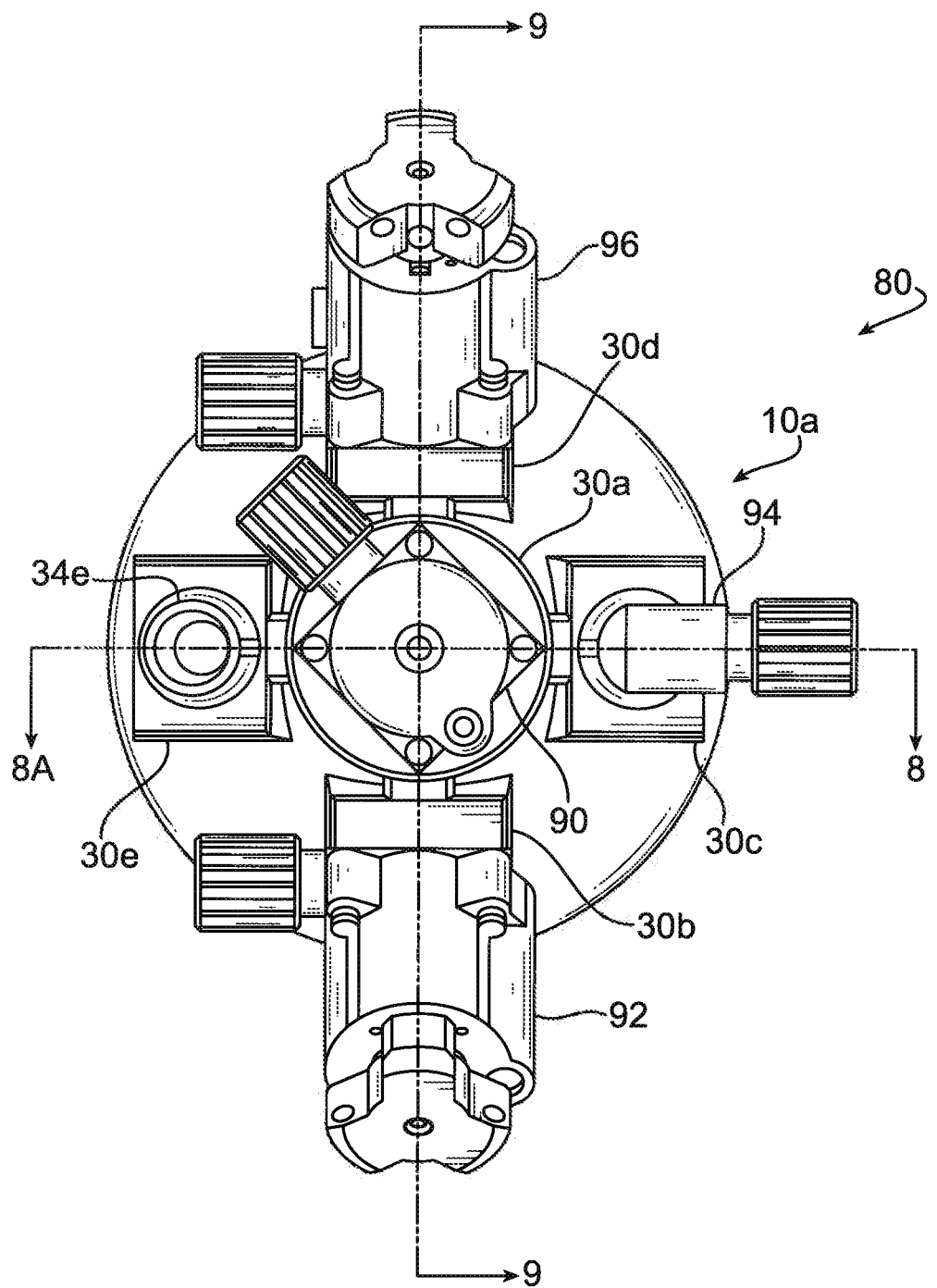
FIG. 7 is a top view of the vessel of FIG. 5.
Figure 8:
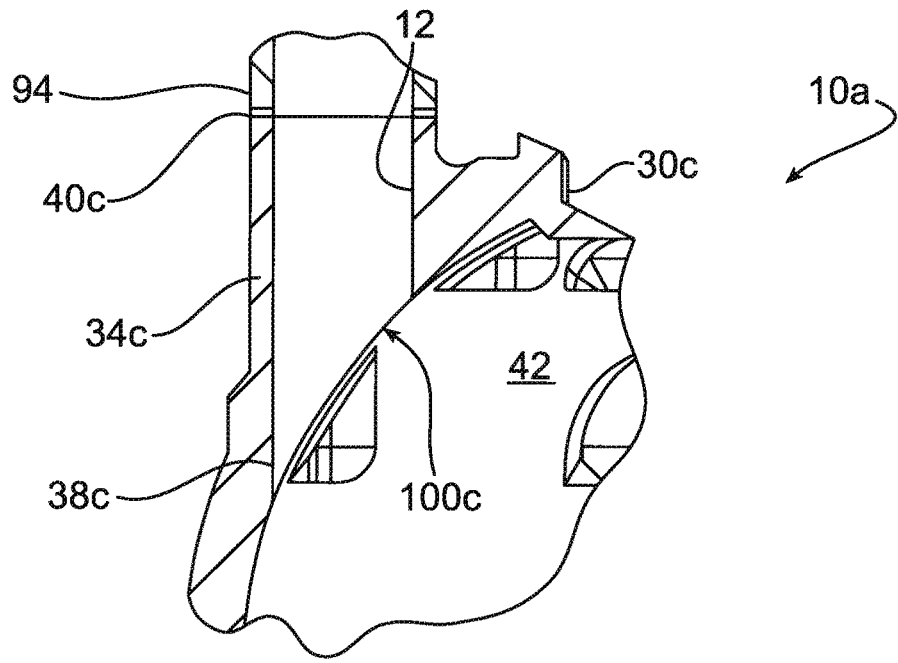
FIG. 8 is a detail of a cross-sectional view of the vessel of FIG. 7 taken through line 8-8A of FIG. 7.
Figure 8A:
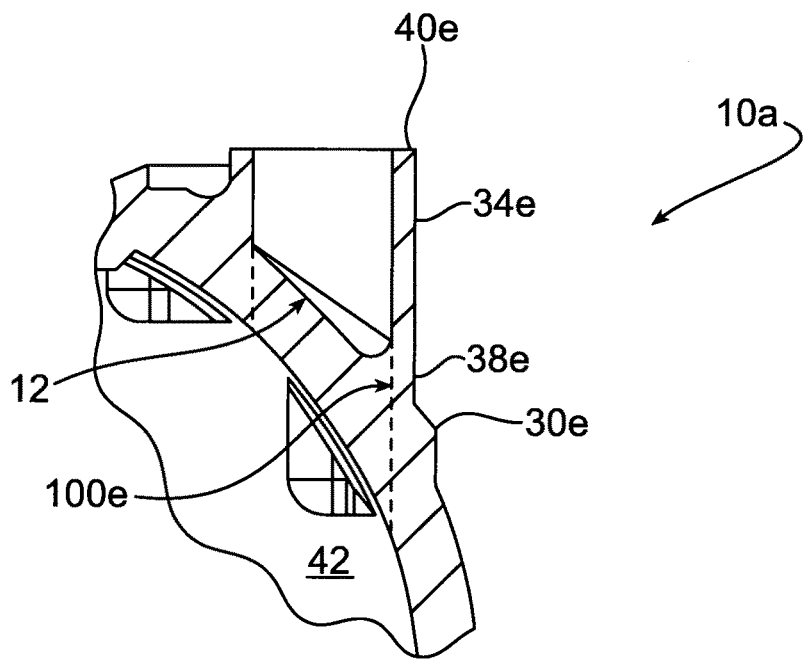
FIG. 8A is a detail of the cross-sectional view of the vessel of FIG. 7 taken through line 8-8A of FIG. 7.

Considering next the top view of FIG. 7 and the detail of the cross-sectional views of FIGS. 8 and 8A, mounting pad 30c is shown in FIG. 8 as being active as connected to fitting 94 with mounting pad 30e being shown in FIG. 8A as being inactive as unconnected to any fluid component. In this regard, the wall 12 closing the proximal end 38c of the stub portion 34c of pad 30c is shown to have been removed, such as by drilling or otherwise machining or thermoforming through the material of the wall 12, to thereby open the port referenced at 100c into the interior volume 42 of the section 10a of which the commonly-referenced interior volume of the vessel 80 (FIGS. 5 and 6) is comprised. In contrast, the wall 12 closing the proximal end 38e of the stub portion 34e of pad 30e is shown to have been left intact so as to maintain as closed the port referenced in phantom at 100e which otherwise would be opened were the pad 30e to have been made active.

Figure 9:
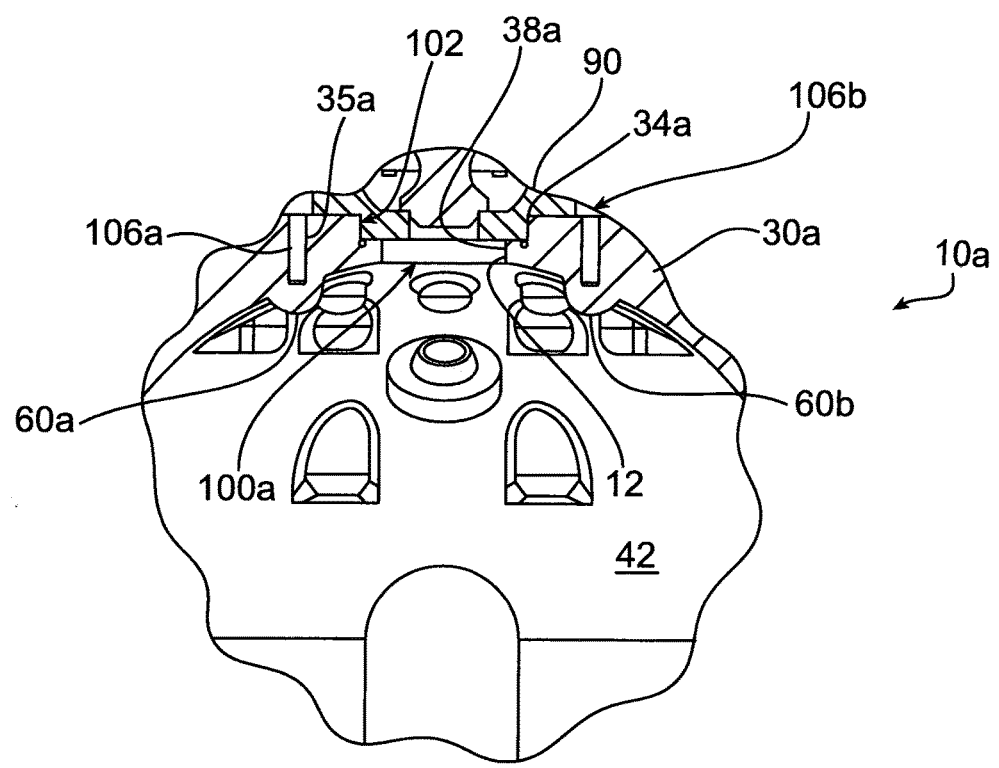
FIG. 9 is a detail of a cross-sectional view of the vessel of FIG. 7 taken through line 9-9 of FIG. 7.

Looking lastly to FIG. 9, the connection of valve 90 to the center mounting pad 30a is depicted in the detail of the cross-sectional view thereof. In that figure, the wall 12 closing the proximal end 38a of the stub portion 34a is shown to have been removed so as to provide the port opening referenced at 100a. With the upstanding extent of the stub portion 34a having been substantially removed, such as by cutting or otherwise machine off, the face 35a may be reformed, such as with a thermoforming tool or the like, so as to allow for a tongue-in-groove sealing connection, referenced at 102, of valve 90 to the pad 30a. As may be seen, the bosses referenced at 60a-b may be threaded or otherwise may receive threaded inserts for the mechanical fastening of the valve base, 104, to the pad 30a via screws, bolts, or the like, 106a-b.

Thus, a configurable pressure vessel incorporating the end cap section of the present invention and the construction thereof have been described.

As it is anticipated that certain changes may be made in the present invention without departing from the precepts herein involved, it is intended that all matter contained in the foregoing description shall be interpreted as illustrative and not in a limiting sense. All references including any priority documents cited herein are expressly incorporated by reference.

What is claimed is:

1. An end cap section for use in the construction of a configurable pressure vessel for connection to at least fluid component, the vessel having an interior volume and comprising at least one said end cap section joined to a second section, said end cap section comprising:
   a generally tubular wall extending along a central longitudinal wall axis from an enclosed first end to an open second end, the wall having an outer surface and an inner surface defining a wall thickness therebetween; and
   at least one mounting pad positioned on the outer surface of the wall on the enclosed first end thereof, the mounting pad having a base portion supported on the wall and a generally tubular stub portion extending along a central longitudinal stub axis outwardly from the base portion intermediate a proximal end adjoining the wall and a distal end configurable for connection to the fluid component, the proximal end being closed by the wall, and the mounting pad base portion having an exterior face surrounding the stub portion, the exterior face being raised relative to the wall outer surface,
   wherein a first said mounting pad positioned such that the central longitudinal stub axis thereof is spaced-apart radially from the central longitudinal wall axis, a second said mounting pad is positioned such that the central longitudinal stub axis thereof is generally coaxial with the central longitudinal wall axis, and a third said mounting pad is positioned such that the central longitudinal stub axis of each of the first and the third said mounting pad is spaced-apart a given radial distance from the central longitudinal wall axis, and
   whereby the proximal end of the stub portion is openable through the wall to provide a port opening into the interior volume of the vessel.

2. The end cap section of claim 1 wherein the cap section is formed of a polymeric material or composite.

3. The end cap section of claim 2 wherein the polymeric material or composite comprises a thermoplastic.

4. The end cap section of claim 2 wherein the polymeric material or composite comprises a plastic selected from the group consisting of fluoropolymers and copolymers and blends thereof.

5. The end cap section of claim 1 wherein the wall first end is generally hemispherically-shaped.

6. The end cap section of claim 1 wherein the exterior face surrounding the stub portion is generally planar.

7. A configurable pressure vessel for connection to at least fluid component, the vessel having an interior volume and comprising at least one end cap section joined to a second section, said end cap section comprising:
   a generally tubular wall extending along a central longitudinal wall axis from an enclosed first end to an open second end, the wall having an outer surface and an inner surface defining a wall thickness therebetween; and
   at least one mounting pad positioned on the outer surface of the wall on the enclosed first end thereof, the mounting pad having a base portion supported on the wall and a generally tubular stub portion extending along a central longitudinal stub axis outwardly from the base portion intermediate a proximal end adjoining the wall and a distal end configurable for connection to the fluid component, the proximal end being closed by the wall, and the mounting pad base portion having an exterior face surrounding the stub portion, the exterior face being raised relative to the wall outer surface,
   wherein a first said mounting pad positioned such that the central longitudinal stub axis thereof is spaced-apart radially from the central longitudinal wall axis, a second said mounting pad is positioned such that the central longitudinal stub axis thereof is generally coaxial with the central longitudinal wall axis, and a third said mounting pad is positioned such that the central longitudinal stub axis of each of the first and the third said mounting pad is spaced-apart a given radial distance from the central longitudinal wall axis, and
   whereby the proximal end of the stub portion is openable through the wall to provide a port opening into the interior volume of the vessel.

8. The pressure vessel of claim 7 wherein the cap section is formed of a polymeric material or composite.

9. The pressure vessel of claim 8 wherein the polymeric material or composite comprises a thermoplastic.

10. The pressure vessel of claim 8 wherein the polymeric material or composite comprises a plastic selected from the group consisting of fluoropolymers and copolymers and blends thereof.

11. The pressure vessel of claim 7 wherein the wall first end is generally hemispherically-shaped.

12. The pressure vessel of claim 7 wherein the exterior face surrounding the stub portion is generally planar.

13. The pressure vessel of claim 7 comprising a first said end cap section and a second said end cap section.

14. A configurable pressure vessel for connection to at least fluid component, the vessel having an interior volume and comprising at least one end cap section joined to a second section, said end cap section comprising:
- a generally tubular wall extending along a central longitudinal wall axis from an enclosed first end to an open second end, the wall having an outer surface and an inner surface defining a wall thickness therebetween;
- at least one mounting pad positioned on the outer surface of the wall on the enclosed first end thereof, the mounting pad having a base portion supported on the wall and a generally tubular stub portion extending along a central longitudinal stub axis outwardly from the base portion intermediate a proximal end adjoining the wall and a distal end configurable for connection to the fluid component, the proximal end being closed by the wall, and the mounting pad base portion having an exterior face surrounding the stub portion, the exterior face being raised relative to the wall outer surface; and
- a generally planar flats portion disposed on the wall outer surface intermediate the first and second end thereof, the flats portion having a first side and a second side opposite the first side, each of the flats first and second side having a groove extending therealong,
- whereby the proximal end of the stub portion is openable through the wall to provide a port opening into the interior volume of the vessel.

15. An end cap section for use in the construction of a configurable pressure vessel for connection to at least fluid component, the vessel having an interior volume and comprising at least one said end cap section joined to a second section, said end cap section comprising:
- a generally tubular wall extending along a central longitudinal wall axis from an enclosed first end to an open second end, the wall having an outer surface and an inner surface defining a wall thickness therebetween;
- at least one mounting pad positioned on the outer surface of the wall on the enclosed first end thereof, the mounting pad having a base portion supported on the wall and a generally tubular stub portion extending along a central longitudinal stub axis outwardly from the base portion intermediate a proximal end adjoining the wall and a distal end configurable for connection to the fluid component, the proximal end being closed by the wall, and the mounting pad base portion having an exterior face surrounding the stub portion, the exterior face being raised relative to the wall outer surface; and
- a generally planar flats portion disposed on the wall outer surface intermediate the first and second end thereof, the flats portion having a first side and a second side opposite the first side, each of the flats first and second side having a groove extending therealong,
- whereby the proximal end of the stub portion is openable through the wall to provide a port opening into the interior volume of the vessel.

\* \* \* \* \*